(12) United States Patent
Keates

(10) Patent No.: US 8,968,916 B2
(45) Date of Patent: Mar. 3, 2015

(54) NON-UNIFORM BATTERY CELL

(75) Inventor: Andy Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 13/538,125

(22) Filed: Jun. 29, 2012

(65) Prior Publication Data

US 2014/0004407 A1  Jan. 2, 2014

(51) Int. Cl.
*H01M 10/04* (2006.01)
*H01M 6/46* (2006.01)
*H01M 2/20* (2006.01)

(52) U.S. Cl.
USPC ........... 429/162; 429/156; 429/160; 429/149; 429/123; 429/152; 429/161

(58) Field of Classification Search
USPC ................... 429/96–100, 149–160, 161–187; 29/623.1–623.5, 745–746; 174/50–64; 439/754–774, 500
See application file for complete search history.

(56) References Cited

U.S. PATENT DOCUMENTS

| | | | |
|---|---|---|---|
| 6,040,075 A * | 3/2000 | Adcock et al. | 429/456 |
| 6,317,248 B1 * | 11/2001 | Agrawal et al. | 359/265 |
| 7,332,893 B2 | 2/2008 | Nguyen et al. | |
| 7,560,829 B2 | 7/2009 | Proefrock et al. | |
| 7,751,994 B2 | 7/2010 | Matsumura et al. | |
| 7,795,843 B2 | 9/2010 | Keates et al. | |

FOREIGN PATENT DOCUMENTS

KR   1020030066960   *   8/2003

OTHER PUBLICATIONS

Machine Translation of Jang (KR 2003-0066960, published Aug. 2003, pp. 1-15).*

* cited by examiner

*Primary Examiner* — Basia Ridley
*Assistant Examiner* — Caitlin Wilmot
(74) *Attorney, Agent, or Firm* — Ked & Associates

(57) ABSTRACT

An apparatus is provided that includes a two or more cell elements stacked internally to create a single cell with a non-uniform height. A first bus bar may electrically couple to a first side or first end of the cell elements in order to connect the terminals of the battery elements. A second bus bar may electrically couple to a second side or second end of the cell elements in order to connect the terminals of the battery elements.

18 Claims, 4 Drawing Sheets

NON-UNIFORM BATTERY CELL

FIELD

Embodiments may relate to a non-uniform battery cell.

BACKGROUND

Batteries may be used in many electronic devices, including usage in laptop and notebook computers and mobile computing devices.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
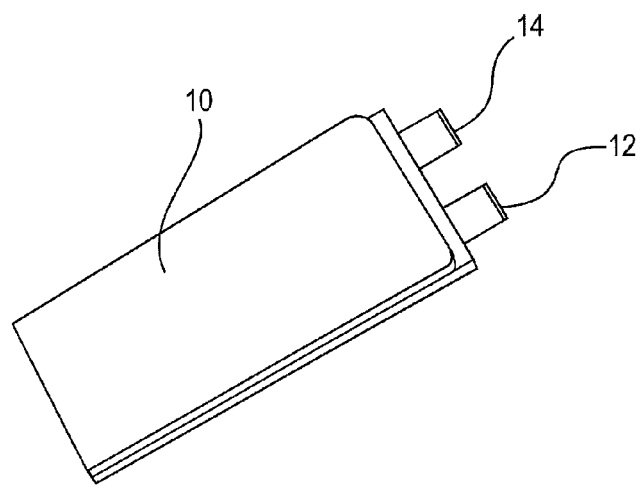
FIG. 1 shows a battery cell according to an example arrangement.

In the following detailed description, like reference numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

A battery may be a device that generates electrical potential through a chemical reaction. A battery may be a rechargeable battery that may be restored to operation by a charging operation. Batteries may include, but are not limited to, nickel cadmium (NiCad), lithium ion (Li-ion), and other rechargeable batteries.

An electronic device may be a notebook computer, a laptop computer, a handheld computer, a tablet PC, an ultra-mobile personal computer (UMPC), a mobile Internet device (MID), a smartphone, a personal digital assistant (PDA), a mobile terminal and/or other similar device.

A battery pack may be a package of one or more battery cells. A battery pack may be used in operation of many electronic devices, include mobile computing devices.

FIG. 1 shows a battery cell according to an example arrangement. Other arrangements may also be provided.

More specifically, FIG. 1 shows a battery cell 10 that has a uniform stacked or wound cell structure. The stacked cell or wound structure may include a number of layers of active and inactive materials used to construct the battery cell. A first tab 12 and a second tab 14 may be provided at one end of the cell structure. In another arrangement, the first tab 12 may be provided at a first end of the cell structure and the second tab 14 may be provided at a second end of the cell structure opposite the first end.

The first tab 12 and the second tab 14 may provide an electrical connection between the uniform stacked cell structure and a power source. As one example, the battery cell 10 may be provided within a battery pack of an electrical device.

When provided within the battery pack, the first tab 12 may electrically connect to a first electrical connector within the battery pack, and the second tab 14 may electrically connect to a second electrical connector within the battery pack.

The first tab 12 and the second tab 14 may provide power from the battery cell to the electronic device. The first tab 12 and the second tab 14 may also be used to charge the battery cell 10.

Figure 2:
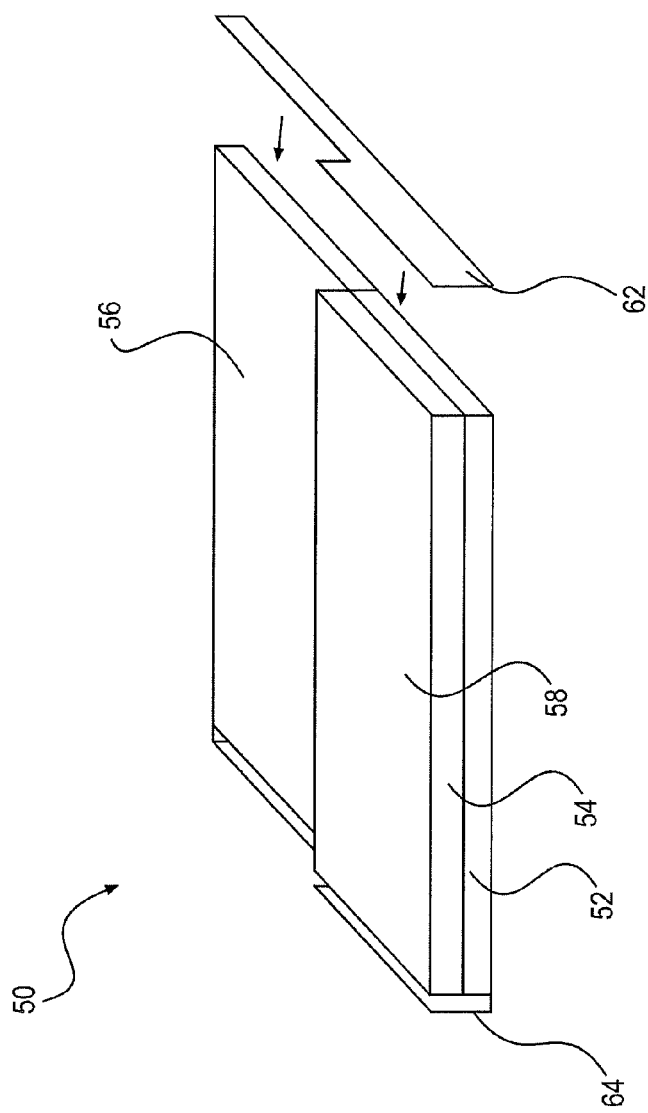
FIG. 2 shows a non-uniform battery cell and corresponding bus bars according to an example embodiment.

FIG. 2 shows a non-uniform battery cell and corresponding bus bars according to an example embodiment. Other embodiments and configurations may also be provided.

The battery cell is non-uniform due to stacking of elements of different sizes within the cell package. FIG. 2 shows a one-step example of a non-uniform battery cell.

FIG. 2 shows non-uniform battery cell 50 and bus bars 62, 64 to electrically couple to ends of the non-uniform battery cell elements. FIG. 2 shows a first cell element 52 (or substrate) that forms a bottom layer of the non-uniform battery cell 50. FIG. 2 also shows a second cell element 54 (or substrate) that is provided on part of the first cell element 52.

FIG. 2 shows a first battery cell element 56 formed by a first part of the first cell element 52, and a second battery cell element 58 formed on the first cell element 52. Accordingly, the non-uniform battery cell 50 may include both the first battery cell element 56 and the second battery cell element 58 contained in a package that constitutes the single non-uniform battery cell 50. Although the term first battery cell element 56 and the term second battery term element 58 are used in the following description, these terms may also be called a first part of the non-uniform battery cell and a second part of the non-uniform battery cell.

As shown, the first battery cell element 56 (or first part) may have a first battery cell height (or thickness), and the second battery cell element 58 (or second part) may have a second battery cell height (or thickness) that is different than the first battery cell height. The different footprints of the first battery cell element 56 and the second battery cell element 58 form the non-uniform battery cell. The two battery cell elements 56, 58 may be assembled into a single battery cell.

The first cell element 52 (or substrate) may have a first cell height (or thickness), and the second cell element 54 may have a second cell height (or thickness). A thickness (or height) of the second battery cell element 58 is a combination of the first cell height and the second cell height.

FIG. 2 also shows the first bus bar 62 to be electrically coupled to a first end of the non-uniform battery cell 50, and a second bus bar 64 to be electrically coupled to a second end of the non-uniform battery cell 50. For ease of discussion, FIG. 2 shows the first bus bar 62 separated from the non-uniform battery cell 50.

The first bus bar 62 and the second bus bar 64 may conduct electricity within the non-uniform battery cell 50. The first bus bar 62 may be electrically coupled to a first electrical connector within an electronic device (or electrical device). The second bus bar 64 may be electrically coupled to a second electrical connector within the electronic device.

As one example, each of the bus bars 62, 64 may be formed of copper or aluminum. The bus bars 62 and 64 may be formed of other materials.

As shown in FIG. 2, the first bus bar 62 may have dimensions to fit against the first end of the non-uniform battery cell 50. A first part of the first bus bar 62 may have a first height to generally correspond to the first battery cell height of the first battery cell element 56. A second part of the first bus bar 62 may have a second battery cell height to generally correspond to the second height of the second battery cell element 58. Stated differently, the second part of the first bus bar 62 may have the second height to generally correspond to a combination of the first cell height (of the first cell element 52) and the second cell height (of the second cell element 54). The first bus bar 62 may generally correspond to the first ends of the first and second battery cell elements 56, 58 so as to provide a proper electrical connection.

The second bus bar 64 may have dimensions to fit against the second end of the non-uniform battery cell 50. A first part of the second bus bar 64 may have a first height to generally correspond to the first battery cell height of the first battery cell element 56 (or first part). A second part of the second bus bar 64 may have a second height to generally correspond to the second battery cell height of the second battery cell element 58 (or second part). Stated differently, the second part of the second bus bar 62 may have the second height to generally correspond to a combination of the first cell height (of the first cell element 52) and the second cell height (of the second cell element 54). The second bus bar 64 may generally correspond to the second end of the first and second battery cell elements 56, 58 so as to provide a proper electrical connection.

The first and second bus bars 62, 64 may be exposed as battery cell terminals directly to outside of the cells or by use of tabs connected to the bus bars, accessible from outside of the battery cell. The battery cell, consisting of two or more battery cell elements, may also be enclosed in a cell pouch.

FIG. 2 shows an example embodiment of the non-uniform battery cell 50. Other numbers of cell elements and/or battery cells may also be provided. In other examples, dimensions (i.e. heights and lengths) of the first and second bus bars 62, 64 may correspond to the respective ends of the non-uniform battery cell.

Figure 3:
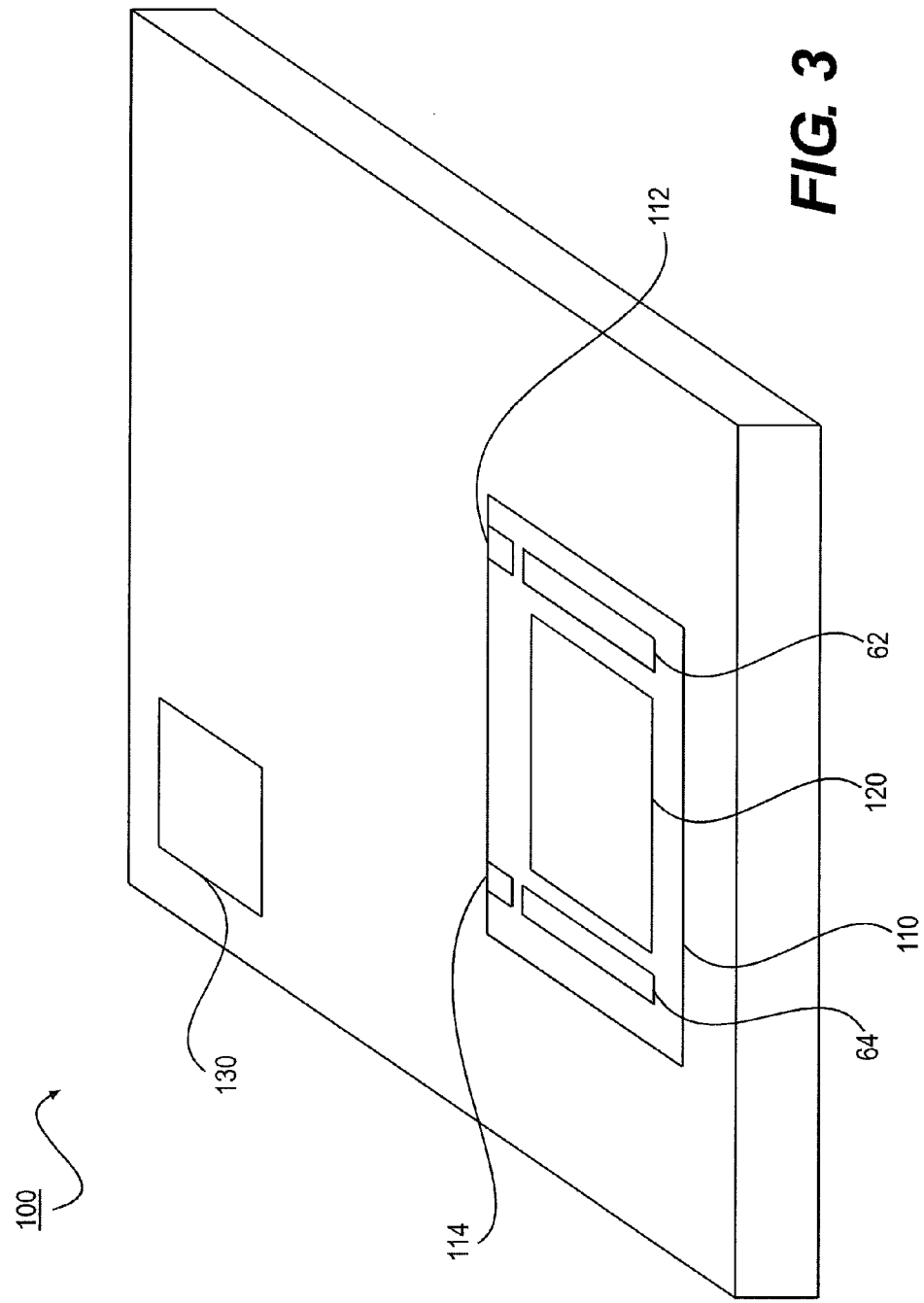
FIG. 3 shows a battery location in an electronic device according to an example embodiment.

FIG. 3 shows a battery port of an electronic device according to an example embodiment. Other embodiments and configurations may also be provided. The battery port may be a cavity or connection to which a battery pack is attached to an electronic device.

FIG. 3 shows a portion of an electronic device 100 (or electrical device). The electronic device 100 may include a battery port 110 to receive a battery pack 120. The battery pack 120 may correspond to the non-uniform battery cell 50 shown in FIG. 2. The battery pack 120 may correspond to other non-uniform battery cells. The battery pack 120 may electrically couple to the first bus bar 62 and the second bus bar 64 within the battery pack 120.

Alternatively, the battery pack 120 may include the first bus bar 62 to electrically couple to the first end of the non-uniform battery cell 50, and the second bus bar 64 to electrically couple to the second end of the non-uniform battery cell 50. In this example, the battery pack 120 may be inserted into the battery port 110 such that the first bus bar 62 is electrically coupled to a first electrical connector 112 and the second bus bar 64 is electrically coupled to a second electrical connector 114.

FIG. 3 also shows that the electronic device 100 may include a power supply 130 to receive an alternate current (AC) power from external of the electronic device 100. The AC or direct current (DC) power may be used to electrically charge the non-uniform battery cell 50 within the battery pack 120 of the electronic device.

Figure 4:
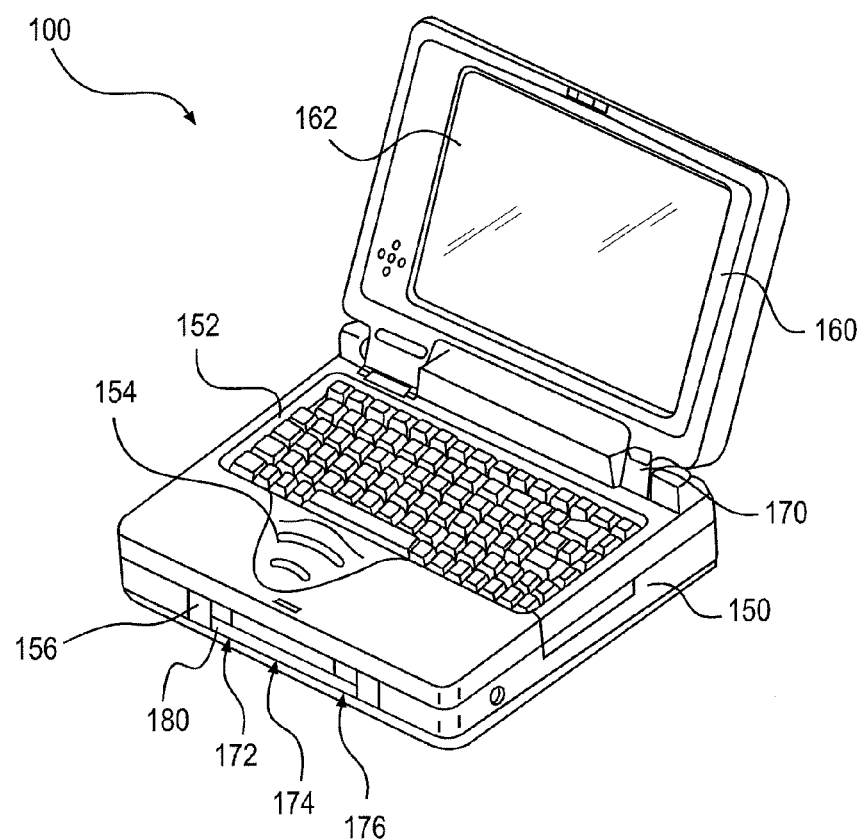
FIG. 4 shows an electronic device having a battery port to receive non-uniform battery cells according to an example embodiment.

FIG. 4 shows an electronic device having a battery port to receive a non-uniform battery cell according to an example embodiment. Other embodiments and configurations may also be provided. The battery port may also receive a plurality of non-uniform battery cells.

FIG. 4 shows the electronic device 100 as a laptop computer, for example. The electronic device may be any one of other types of electronic devices, such as a notebook computer, an ultra-mobile personal computer, a mobile Internet device, a smartphone, a personal digital assistant, a mobile terminal and/or other similar devices.

The electronic device 100 may include a base 150 and a lid 160 that are coupled together by a hinge device 170. The lid 160 may include a display 162. The base 150 may include a keyboard 152, a touchpad 154 and a battery port 156. Other components of the base 150 and the lid 160 may be provided, but are not shown for ease of discussion.

FIG. 4 shows a non-uniform battery cell 180 provided within the battery port 156.

The battery port 156 may be provided under the touchpad 154, for example. In view of mechanical constrictions under the touchpad 154, the battery port 156 and/or the non-uniform battery cells 180 provided within the battery port 156 may be constructed such that the non-uniform battery cells 180 may be provided under the touchpad 154 with a lower profile than to the left and right of the touchpad 154.

The non-uniform battery cells 180 may be provided as a battery pack, for example.

In the FIG. 4 example, the non-uniform battery cells 180 may include a first cell element (or substrate) and a second cell element (or substrate) provided on top of a left side of the first cell element and provided on top of a right side of the first cell element. In the FIG. 4 example, the second cell element is not provided on top of the first cell element at a middle area (between the left side and the right side). The non-uniform battery cells 180 may have a first battery cell element 172 (or first part), a second battery cell element 174 (or second part) and a third battery cell element 176 (or third part). The second battery cell element 174 may be provided between the first battery cell element 172 and the third battery cell element 176. The second battery cell element 174 may have a lower height than the first battery cell element 172 and/or the third battery cell element 176. This may allow the battery cells to be provided under the touchpad 154, since the touchpad may have electronic components (or mechanical components) immediately under the touchpad 154.

A first bus bar may be provided at a first end of the non-uniform battery cells 180. A second bus bar may be provided at a second end of the non-uniform battery cells 180.

The first bus bar may have a non-uniform height that corresponds to the battery cell height of each of the first battery cell element 172 (or first part), the second battery cell element 174 (or second part) and the third battery cell element 176 (or third part) (all provided at a first end of the non-uniform battery cells 180).

Stated differently, the first bus bar may have a non-uniform height that corresponds to: (1) a combined height of the first cell element and the second cell element; (2) a height of the first cell element; and (3) a combined height of the first cell element and the second cell element.

The second bus bar may have a non-uniform height that corresponds to the battery cell height of each of the first battery cell element 172 (or first part), the second battery cell element 174 (or second part) and the third battery cell element 176 (or third part) (all provided at a second end of the non-uniform battery cells 180).

Stated differently, the second bus bar may have a non-uniform height that corresponds to: (1) a combined height of the first cell element and the second cell element; (2) a height of the first cell element; and (3) a combined height of the first cell element and the second cell element.

The non-uniform battery cells 180 may be provided at a different location in the electronic device 100. The non-uniform pattern may allow the battery cells to be provided in a unique location since different sizes, and/or locations of the battery cells may be provided. This may allow a thinner electronic device to be manufactured.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus comprising:
   a first cell element having a first flat surface and a second flat surface, and the first cell element having a uniform height between the first flat surface and the second flat surface;
   a second cell element, the second cell element to be stacked on a first portion of the first flat surface of the first cell element, the first cell element and the second cell element to form a non-uniform battery cell having a first battery cell height and a second battery cell height, the second battery cell height being at a first area in which the second cell element is stacked on a first portion of the first cell element and the first battery cell height at a second area corresponding to a second portion of the first cell element, and the second battery cell height is greater than the first battery cell height;
   a first bus bar to electrically couple to a first end of the first cell element and to electrically couple to a first end of the second cell element, the first bus bar having a first bus bar height corresponding to the first battery cell height and a second bus bar height corresponding to the second battery cell height, the second bus bar height being greater than the first bus bar height; and
   a second bus bar to electrically couple to a second end of the first cell element and to electrically couple to a second end of the second cell element, the second bus bar having a third bus bar height corresponding to the first battery cell height and a fourth bus bar height corresponding to the second battery cell height, the fourth bus bar height being greater than the third bus bar height.

2. The apparatus of claim 1, wherein the first cell element has a first height and the second cell element has a second height, and a combined height of the first cell element and the second cell element at the first area of the non-uniform battery cell is greater than the first height of the first cell element at the second area of the non-uniform battery cell.

3. The apparatus of claim 1, wherein the first cell element has a flat configuration, and the second cell element has a flat configuration.

4. The apparatus of claim 1, wherein the first cell element is a non-layered structure, and the second cell element is a non-layered structure.

5. The apparatus of claim 1, wherein the first bus bar to have a configuration to match the first end of the first cell element and the first end of the second cell element.

6. The apparatus of claim 1, wherein the second bus bar to have a configuration to match the second end of the first cell element and the second end of the second cell element.

7. The apparatus of claim 1, wherein the first bus bar is formed of copper or aluminum.

8. An apparatus comprising:
   a single non-uniform battery cell having a first part and a second part, the first part being a non-layered structure that includes a first battery cell element having a flat surface, and the second part being a layered structure that includes the flat surface of the first battery cell element, the first part of the single non-uniform battery cell having a first height, the second part of the single non-uniform battery cell having a second height, the second height being greater than the first height;
   a first bus bar to electrically couple to a first end of the first part of the single non-uniform battery cell and to electrically couple to a first end of the second part of the single non-uniform battery cell, the first bus bar having a third height at an area corresponding to the first part of the single non-uniform battery cell and a fourth height at an area corresponding to the second part of the single non-uniform battery cell, the fourth height to correspond to the second height and the third height to correspond to the first height; and
   a second bus bar to electrically couple to a second end of the first part of the non-uniform battery cell and to electrically couple to a second end of the second part of the non-uniform battery cell, the second bus bar having a fifth height at an area corresponding to the first part of the single non-uniform battery cell and a sixth height at an area corresponding to the second part of the single non-uniform battery cell, the sixth height to correspond to the second height and the fifth height to correspond to the first height.

9. The apparatus of claim 8, wherein the first bus bar to have a configuration to match the first part of the non-uniform battery cell and the first end of the second part of the non-uniform battery cell.

10. The apparatus of claim 8, wherein the second bus bar to have a configuration to match the second end of the first part of the non-uniform battery cell and the second part of the non-uniform battery cell.

11. The apparatus of claim 8, wherein the first bus bar is formed of copper or aluminum.

12. An electronic device comprising:
   a battery port to receive a non-uniform battery cell, the non-uniform battery cell including a first cell element and a second cell element, the second cell element to be stacked on the first cell element, the non-uniform battery cell having a first battery cell height and a second battery cell height, the second battery cell height being at a first area in which the second cell element is stacked on the first cell element and the first battery cell height being at a second area of the non-uniform battery cell, the second battery cell height being greater than the first battery cell height;
   a first bus bar to electrically couple to a first end of the non-uniform battery cell, the first bus bar to have a first bus bar height and a second bus bar height, the first bus bar height to correspond to the first battery cell height and the second bus bar height to correspond to the second battery cell height, the second bus bar height being greater than the first bus bar height; and a second bus bar to electrically couple to a second end of the non-uniform battery cell, the second bus bar to have a third bus bar height and a fourth bus bar height, the third bus bar height to correspond to the first battery cell height and the fourth bus bar height to correspond to the second battery cell height, the fourth bus bar height being greater than the third bus bar height.

13. The electronic device of claim 12, wherein the first cell element has a first height and the second cell element has a second height, and a combined height of the first cell element and the second cell element at the first area of the non-uniform battery cell is greater than the first height of the first cell element at the second area of the non-uniform battery cell.

14. The electronic device of claim 12, wherein the first cell element has a flat configuration, and the second cell element has a flat configuration.

15. The electronic device of claim 12, wherein the first cell element is a non-layered structure, and the second cell element is a non-layered structure.

16. The electronic device of claim 12, wherein the first bus bar to have a configuration to match a first end of the first cell element and a first end of the second cell element.

17. The electronic device of claim 12, wherein the second bus bar to have a configuration to match a second end of the first cell element and a second end of the second cell element.

18. The apparatus of claim 12, wherein the first bus bar is formed of copper or aluminum.

\* \* \* \* \*